June 18, 1929. H. NAGAOKA ET AL 1,717,462
ELECTROMAGNETIC CHEMICAL BALANCE
Filed Nov. 10, 1924
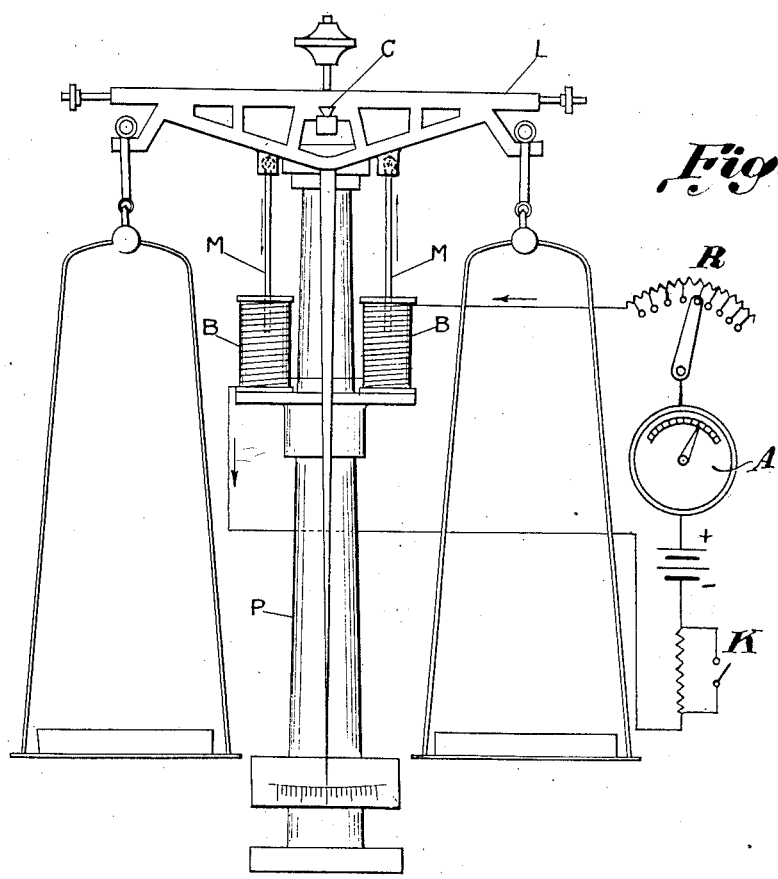
Fig.1.
Fig.2.
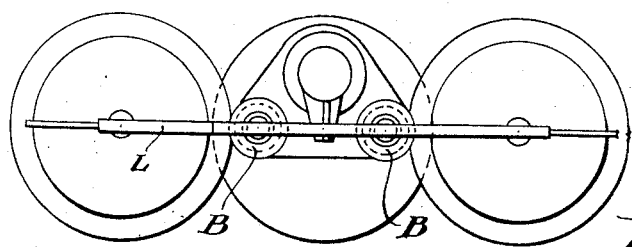
Inventors
H. Nagaoka
J. Ikebe
By Marks & Clerk Patented June 18, 1929.

1,717,462

UNITED STATES PATENT OFFICE.

HANTARO NAGAOKA AND JOTO IKEBE, OF TOKYO, JAPAN, ASSIGNORS TO ZAIDAN HOJIN RIKAGAKU KENKYUJO, OF TOKYO, JAPAN.

ELECTROMAGNETIC CHEMICAL BALANCE.

Application filed November 10, 1924, Serial No. 749,053, and in Japan November 20, 1923.

This invention relates to an electromagnetic chemical balance in which a part of the weight of a balance is replaced by a couple produced by mutual action of magnetism and electricity. In hitherto known chemical balance it is necessary to repeatedly take on or off weights to accomplish the final balancing of the balance. The object of the invention is to eliminate such troubles and labour as above stated and also to possibly shorten the time required for the balancing operation.

In the accompanying drawing:

Figure 1 shows a front elevation of the new balance according to the invention; and, Fig. 2 shows a plan view thereof.

According to this invention, the arms L are provided with armatures M in both sides and at equal distances from the central knife edge C. The ends of these armatures M are protruded into the axial centers of electrical coils B, B which are fitted to the central post P or unmovable part of the balance directly beneath the magnets. The electro-magnets B are entirely same in number of turns, diameter of the wire and in other constructional conditions or the direction of winding may be mutually reversed. They are supplied with electricity from a source of electricity E by a suitable connection to which a galvanometer A, an adjustable rheostat R, a brake resistance $r$ and a key K are connected as shown.

When the coils are put in action by closing the circuit, a couple will act upon the arm L by mutual action of the armatures M, suitably magnetized and the electromagnets B, B. Therefore, when weighing a mass by this balance, the unbalance of the mass and the weight can be balanced by such electromagnetic couple as the magnitude of the couple can be varied according to the strength of current supplied. In other words, the operation of the final balancing of weight hitherto used, which is very troublesome and delicate, can be replaced by adjustment of the strength of current flowing coils of magnets B, B.

Thus, according to this invention the accurate balancing of the balance by means of weight is accomplished by adjusting the current supplied to the magnet B, B, and this can be operated by moving a handle of the adjustable rheostat R. Therefore the drawback such as of touching and giving shock to moving part of the balance in usual balancing operation wherein the final adjustment of the weight is accomplished by, for instance, riders, etc., is entirely obviated and thereby any chance of inducing swinging of moving part of the balance is entirely obviated.

In this invention, one may use a suitable galvanometer. This invention results in an electromagnetic device having sensibility of many hundred times as that of the usual balance. Thus, a simple rough adjustment of the weight may be sufficient when this balance is practically used, and a further accurate result may be obtained by adjusting the current, or by reading of the needle of the galvanometer.

In addition to rheostat R, another resistance $r$ with short circuiting key K is also provided in the circuit in order to brake the swing of the balance. Therefore, when weighing a mass, the swinging motion of the lever of the balance can be stopped by pressing the key during a short period at a proper instant and thus the time required for weighing can be remarkably shortened.

Briefly, the invention consists in a balance to which a couple produced by mutual action of a magnet and electricity is applied and thereby the final accurate adjustment of the weight is replaced and also the time required for balancing is possibly shortened.

The solenoids B as shown, are firmly fastened to the standard of the balance. Armatures M fixed to the beam of the balance are so arranged that they are within the magnetic field of the solenoid and thus, when a current is flowing through the solenoid they will be attracted or repulsed. During the process of weighing, the article to be weighed is put on the right hand pan for instance, and weights are placed on the left hand pan until an approximate balance is reached. The solenoids are then energized gradually, the current being regulated by the resistance R. The left hand armature is drawn into the solenoid whereas the right hand armature is repulsed and in this fashion an electromagnetic couple is set up. The current is gradually increased until a balance is reached and the pull of the solenoid is translated into weight units so that the apparatus gives a rapid weight determination of the article or substance weighed.

The operation of the braking effect is as follows. During the process of weighing, there will be some swinging about the fulcrum. C. As the right hand pan swings downward in its oscillation, the key K is instantaneously applied. The effect of short circuiting the resistance by means of the key K, is that a somewhat greater current is momentarily passed through the solenoid and the magnetic couple is suddenly increased. That is, the left hand armature is suddenly pulled into its corresponding solenoid during the downward swing of the right hand pan. A braking effect is therefore suddenly exerted which tends to resist the downward swing of the right hand pan.

In this way, the time of weighing is materially shortened and a balance is arrived at without the time consuming operation of waiting for the oscillation of the beam about the fulcrum to cease of its own accord. The short circuiting of the resistance is equivalent to pushing one of the pans down, but the pan that is pushed down is the one which is rising, that is the left hand pan. In other words, the short circuiting of the resistance acts to stop the upward rise of the left hand pan during the period of oscillation. The application of the short circuiting key is instantaneous and is not prolonged.

Claims:

1. A balance comprising a lever, a fulcrum intermediate the ends of said lever, means for exerting an adjustable electromagnetic couple on said lever comprising a pair of fixed solenoids, a pair of armatures inserted in each of said solenoids and operatively connected on either side of said fulcrum to said lever, means for energizing said solenoids, and means for measuring the couple in terms of the current flowing through said solenoids.

2. A balance comprising a lever, a fulcrum intermediate the ends of said lever, means for exerting an adjustable electromagnetic couple on said lever comprising a pair of fixed solenoids, a pair of magnetic armatures inserted in each of said solenoids and operatively connected on either side of said fulcrum to said lever, means for energizing said solenoids, means for measuring the couple in terms of the current flowing through said solenoids.

3. A balance comprising a lever, a fulcrum intermediate the ends of said lever, means for exerting an adjustable electromagnetic couple on said lever comprising a pair of fixed solenoids, a pair of magnetic armatures inserted in each of said solenoids and operatively connected on either side of said fulcrum to said lever, means for energizing said solenoids, means for measuring the couple in terms of the current flowing through said solenoids, and a resistance in the solenoids circuit, and means for short-circuiting said resistance including a tap key.

In testimony whereof we affix our signatures.

HANTARO NAGAOKA.
JOTO IKEBE.